United States Patent
DeLorme et al.

(10) Patent No.: US 9,736,198 B2
(45) Date of Patent: *Aug. 15, 2017

(54) PROCESSING MESSAGES WITH A DEVICE SERVER OPERATING IN A TELEPHONE

(71) Applicant: AT&T Intellectual Property I, LP, Atlanta, GA (US)

(72) Inventors: David Brux DeLorme, Stone Mountain, GA (US); Anita Simpson, Decatur, GA (US); Nicholas Peter Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/615,516

(22) Filed: Feb. 6, 2015

(65) Prior Publication Data
US 2015/0156224 A1 Jun. 4, 2015

Related U.S. Application Data

(63) Continuation of application No. 13/184,554, filed on Jul. 17, 2011, now Pat. No. 8,989,055.

(51) Int. Cl.
*H04L 29/06* (2006.01)
*H04N 21/61* (2011.01)
(Continued)

(52) U.S. Cl.
CPC ...... *H04L 65/1096* (2013.01); *H04L 61/2007* (2013.01); *H04L 61/605* (2013.01);
(Continued)

(58) Field of Classification Search
CPC ... H04L 51/18; H04L 65/1096; H04L 61/605; H04L 61/2007; H04N 21/6187;
(Continued)

(56) References Cited

U.S. PATENT DOCUMENTS

| 5,025,370 A | 6/1991 | Koegel et al. |
| 5,168,568 A | 12/1992 | Thayer et al. |

(Continued)

OTHER PUBLICATIONS

B. Zimmerly, "'A Tiny Cloud in Android—Exploring the Android File System from Your Browser'," pp. 1-17, http://www.ibm.com/developeworks/opensource/library/os-tinycloud/index.htm, website last visited Oct. 1, 2010.

(Continued)

*Primary Examiner* — Joshua Kading
(74) *Attorney, Agent, or Firm* — Guntin & Gust, PLC; Joseph Hrutka (57) ABSTRACT

A system that incorporates teachings of the present disclosure may include, for example, a computer-readable storage medium in a telephone having computer instructions to execute a web server application in the telephone. The web server application can be operable to detect an incoming plain old telephone service call, identify a calling party identifier from the incoming plain old telephone service call, and direct one of a plurality of devices detected by web server application to present the calling party identifier. Other embodiments are disclosed.

20 Claims, 8 Drawing Sheets

(51) Int. Cl.
- *H04M 7/00* (2006.01)
- *H04L 29/12* (2006.01)
- *H04L 12/58* (2006.01)
- *H04M 3/42* (2006.01)

(52) U.S. Cl.
CPC ..... *H04M 3/42059* (2013.01); *H04M 7/0033* (2013.01); *H04N 21/6137* (2013.01); *H04N 21/6187* (2013.01); *H04L 51/18* (2013.01); *H04M 3/42042* (2013.01); *H04M 2203/354* (2013.01)

(58) Field of Classification Search
CPC .......... H04N 21/6137; H04M 3/42059; H04M 3/42042; H04M 7/0033; H04M 2203/354
See application file for complete search history.

(56) References Cited

U.S. PATENT DOCUMENTS

| | | |
|---|---|---|
| 5,237,567 A | 8/1993 | Nay et al. |
| 5,339,442 A | 8/1994 | Lippincott et al. |
| 5,564,025 A | 10/1996 | De Freese et al. |
| 5,689,559 A | 11/1997 | Park |
| 5,761,421 A | 6/1998 | Van Hoff |
| 6,006,303 A | 12/1999 | Barnaby et al. |
| 6,167,513 A | 12/2000 | Inoue et al. |
| 6,463,153 B1 | 10/2002 | Sako et al. |
| 6,473,401 B1 | 10/2002 | Kong et al. |
| 6,938,156 B2 | 8/2005 | Wheeler et al. |
| 7,016,951 B1 | 3/2006 | Longworth et al. |
| 7,127,619 B2 | 10/2006 | Unger et al. |
| 7,194,438 B2 | 3/2007 | Sovio et al. |
| 7,260,597 B1 * | 8/2007 | Hofrichter et al. ........... 709/200 |
| 7,391,866 B2 | 6/2008 | Fukami et al. |
| 7,412,727 B2 | 8/2008 | Kim |
| 7,430,753 B2 | 9/2008 | Gray |
| 7,492,899 B2 | 2/2009 | Qiao |
| 7,546,354 B1 | 6/2009 | Fan et al. |
| 7,590,703 B2 | 9/2009 | Cashman et al. |
| 7,634,076 B2 | 12/2009 | Lee et al. |
| 7,720,986 B2 | 5/2010 | Savoor |
| 7,756,130 B1 | 7/2010 | Lee |
| 7,761,531 B2 | 7/2010 | Johnson et al. |
| 8,015,253 B1 | 9/2011 | Zapata et al. |
| 8,108,359 B1 | 1/2012 | Cooley et al. |
| 8,108,916 B2 | 1/2012 | Fink et al. |
| 8,116,808 B2 | 2/2012 | Amine |
| 8,130,738 B2 | 3/2012 | Chan et al. |
| 8,169,958 B2 | 5/2012 | Torres et al. |
| 8,332,905 B2 | 12/2012 | Jenkin et al. |
| 8,392,947 B2 | 3/2013 | Grannan et al. |
| 8,396,475 B1 | 3/2013 | Bonner |
| 8,443,420 B2 | 5/2013 | Brown et al. |
| 8,516,039 B2 | 8/2013 | Meuninck et al. |
| 8,989,055 B2 * | 3/2015 | DeLorme ............ H04M 7/0033 370/259 |
| 2002/0078130 A1 | 6/2002 | Thornton et al. |
| 2002/0143773 A1 | 10/2002 | Spicer et al. |
| 2002/0157002 A1 | 10/2002 | Messerges et al. |
| 2002/0184301 A1 | 12/2002 | Parent |
| 2003/0026423 A1 | 2/2003 | Unger et al. |
| 2003/0051041 A1 | 3/2003 | Kalavade et al. |
| 2003/0095664 A1 | 5/2003 | Asano et al. |
| 2003/0190024 A1 | 10/2003 | Ju |
| 2004/0133794 A1 | 7/2004 | Kocher et al. |
| 2004/0185876 A1 | 9/2004 | Groenendaal et al. |
| 2004/0215746 A1 | 10/2004 | McCanne et al. |
| 2004/0240668 A1 | 12/2004 | Bonan et al. |
| 2004/0253923 A1 | 12/2004 | Braley |
| 2005/0010637 A1 | 1/2005 | Dempski et al. |
| 2005/0044223 A1 | 2/2005 | Meyerson et al. |
| 2005/0125819 A1 | 6/2005 | Ono et al. |
| 2005/0138192 A1 | 6/2005 | Encarnacion et al. |
| 2005/0147126 A1 | 7/2005 | Qiu et al. |
| 2005/0177515 A1 | 8/2005 | Kalavade et al. |
| 2005/0235329 A1 | 10/2005 | Karaoguz et al. |
| 2005/0251821 A1 | 11/2005 | Pina |
| 2006/0009247 A1 | 1/2006 | Kelley et al. |
| 2006/0031451 A1 | 2/2006 | Lortz et al. |
| 2006/0046714 A1 | 3/2006 | Kalavade |
| 2006/0098593 A1 | 5/2006 | Edvardsen et al. |
| 2006/0123099 A1 | 6/2006 | Paila |
| 2006/0150251 A1 | 7/2006 | Takashima et al. |
| 2006/0172700 A1 | 8/2006 | Wu |
| 2006/0193456 A1 | 8/2006 | Light et al. |
| 2006/0209773 A1 | 9/2006 | Hundal et al. |
| 2006/0220838 A1 | 10/2006 | Wakim et al. |
| 2006/0262913 A1 | 11/2006 | Cook et al. |
| 2006/0271968 A1 | 11/2006 | Zellner |
| 2007/0005506 A1 | 1/2007 | Candelore et al. |
| 2007/0019670 A1 | 1/2007 | Falardeau et al. |
| 2007/0022469 A1 | 1/2007 | Cooper et al. |
| 2007/0055783 A1 | 3/2007 | Gourraud |
| 2007/0097860 A1 | 5/2007 | Rys |
| 2007/0140448 A1 | 6/2007 | Lin et al. |
| 2007/0142036 A1 | 6/2007 | Wikman et al. |
| 2007/0157281 A1 | 7/2007 | Ellis |
| 2007/0180082 A1 | 8/2007 | Abraham et al. |
| 2007/0180111 A1 | 8/2007 | Chmaytelli et al. |
| 2007/0263853 A1 | 11/2007 | Pearson et al. |
| 2007/0298842 A1 | 12/2007 | Kamada et al. |
| 2008/0009265 A1 | 1/2008 | Fernandez-Alonso et al. |
| 2008/0074258 A1 | 3/2008 | Bennett et al. |
| 2008/0195406 A1 | 8/2008 | Matsumoto |
| 2008/0281926 A1 * | 11/2008 | Walter et al. ................. 709/206 |
| 2008/0320534 A1 | 12/2008 | Wang et al. |
| 2009/0019492 A1 | 1/2009 | Grasset |
| 2009/0031360 A1 | 1/2009 | Kidd et al. |
| 2009/0063193 A1 | 3/2009 | Barton et al. |
| 2009/0088197 A1 | 4/2009 | Stewart |
| 2009/0089183 A1 | 4/2009 | Afram et al. |
| 2009/0093237 A1 | 4/2009 | Levenshteyn |
| 2009/0106366 A1 | 4/2009 | Virtanen et al. |
| 2009/0171985 A1 | 7/2009 | Tischer |
| 2009/0193486 A1 | 7/2009 | Patel et al. |
| 2009/0204617 A1 | 8/2009 | Benson et al. |
| 2009/0282098 A1 | 11/2009 | Karaoguz |
| 2009/0288122 A1 | 11/2009 | Zellner |
| 2009/0298514 A1 | 12/2009 | Ullah |
| 2009/0298535 A1 | 12/2009 | Klein et al. |
| 2009/0327702 A1 | 12/2009 | Schnell |
| 2009/0328118 A1 | 12/2009 | Ravishankar |
| 2009/0328228 A1 | 12/2009 | Schnell |
| 2010/0023952 A1 | 1/2010 | Sandoval et al. |
| 2010/0031298 A1 | 2/2010 | Iwanami et al. |
| 2010/0031366 A1 | 2/2010 | Knight et al. |
| 2010/0052853 A1 | 3/2010 | Hilton |
| 2010/0058398 A1 | 3/2010 | Ojala et al. |
| 2010/0071021 A1 | 3/2010 | Friedman et al. |
| 2010/0076274 A1 | 3/2010 | Severson |
| 2010/0131393 A1 | 5/2010 | Pattabiraman et al. |
| 2010/0194335 A1 | 8/2010 | Kirby et al. |
| 2010/0197238 A1 | 8/2010 | Pathuri et al. |
| 2010/0275249 A1 | 10/2010 | McCann et al. |
| 2010/0328547 A1 | 12/2010 | Mayorga |
| 2011/0022522 A1 | 1/2011 | Sege |
| 2011/0055901 A1 | 3/2011 | Karaoguz et al. |
| 2011/0130118 A1 | 6/2011 | Fan |
| 2011/0131398 A1 | 6/2011 | Chaturvedi et al. |
| 2011/0197264 A1 | 8/2011 | McDade |
| 2011/0209221 A1 | 8/2011 | Hanson et al. |
| 2011/0258437 A1 | 10/2011 | McKelvey |
| 2012/0002567 A1 | 1/2012 | Sun et al. |
| 2012/0030034 A1 | 2/2012 | Knapp et al. |
| 2012/0036549 A1 | 2/2012 | Patel et al. |
| 2012/0062796 A1 | 3/2012 | Roberts et al. |
| 2012/0079507 A1 | 3/2012 | Agarwal et al. |
| 2012/0081209 A1 | 4/2012 | Brown et al. |
| 2012/0084342 A1 | 4/2012 | Brown et al. |
| 2012/0084834 A1 | 4/2012 | Brown |
| 2012/0246214 A1 | 9/2012 | Ogawa et al. |
| 2013/0031261 A1 | 1/2013 | Suggs et al. |
| 2013/0254353 A1 | 9/2013 | Liu et al. |

(56) References Cited

U.S. PATENT DOCUMENTS

| | | | |
|---|---|---|---|
| 2014/0298418 | A9 | 10/2014 | Cronk et al. |
| 2016/0212739 | A1 | 7/2016 | Brown et al. |
| 2016/0255413 | A1 | 9/2016 | Brown et al. |
| 2016/0286531 | A1 | 9/2016 | Morris |

OTHER PUBLICATIONS

Davies, C., ""i-Jetty Turns Android Cellphone Into Mobile Webserver",", pp. 1-6, http://www.phonemag.com/i-jetty-turnsandroid-cellphone-into-mobile-webserver-031762 . . . , posted Mar. 17, 2008, website last visited Oct. 1, 2010.

Davies, C., "i-Jetty Turns Android Cellphone Into Mobile Webserver", 6 pages, http://www.phonemag.com/i-jetty-turns-android-cellphone-into-mobile-webserver-031762 . . . , posted Mar. 17, 2008, website last visited Oct. 1, 2010.

Lin, et al., ""On Controlling Digital TV Set-Top-Box by Mobile Devices via IP Network",", pp. 1-8, Proceedings of the Seventh IEEE International Symposium on Multimedia (ISM '05), Computer Society, 2005.

Lin, et al., "On Controlling Digital TV Set-Top-Box by Mobile Devices via IP Network", 8 pages, Proceedings of the Seventh IEEE International Symposium on Multimedia (ISM '05), Computer Society, 2005.

Linux, Devices, ""iNTEL 'Personal Server' Research: Mobile Computing in the Palm of your Hand",", pp. 1-4, http://www.linuxfordevices.com/c/a/Linux-For-Devices-Articles/Intel-Personal-Server-res . . . , website last visited Oct. 1, 2010.

Linux Devices, "Intel 'Personal Server' Research: Mobile Computing in the Palm of your Hand", pp. 1-4, http://www.linuxfordevices.com/c/a/Linux-For-Devices-Articles/Intel-Personal-Server-res . . . , website last visited Oct. 1, 2010.

Rendon, et al., "Architecture for Web Services Access from Mobile Devices", Web Congress, LA-WEB 2005, Third Latin American, 2005.

Soroko, ""Web Server on Your Cellphone—A New Design Space",", Popular Logistics, Feb. 16, 2010, 4 pages.

Soroko, Jonathan , "Web Server on Your Cellphone—a New Design Space", pp. 1-4, Popular Logistics, Feb. 16, 2010.

Toorani, et al., ""LPKI—A Lightweight Public Key Infrastructure for the Mobile Environments"", pp. 162-166, IEEE 2008, ICCS 2008.

Toorani, et al., "LPKI—A Lightweight Public Key Infrastructure for the Mobile Environments", pp. 162-166, IEEE 2008, ICCS 2008.

Wikipedia, ""Mobile Web Server (Symbian OS)",", 1 page, http://en.wikipedia.org/wiki/Mobile_Web_Server_(Symbian_OS), website last visited Oct. 1, 2010.

Wikipedia, ""Mobile Web Server",", pp. 1-3, Page last modified Sep. 11, 2010.

Wikipedia, "Mobile Web Server", pp. 1-3, website last visited Oct. 1, 2010.

Wikipedia, "Mobile Web Server (Symbian OS)", 1 page, http://en.wikipedia.org/wiki/Mobile_Web_Server_(Symbian_Os), website last visited Oct. 1, 2010.

Zimmerly, Bill, "A Tiny Cloud in Android", 17 pages article, website last visited Oct. 1, 2010, http://www.ibm.com/developerworks/opensources/library/os-tinycloud/index.html.

* cited by examiner

PROCESSING MESSAGES WITH A DEVICE SERVER OPERATING IN A TELEPHONE

CROSS REFERENCE TO RELATED APPLICATIONS

This application is a continuation of and claims priority to U.S. patent application Ser. No. 13/184,554, filed Jul. 17, 2011. This application is related to U.S. patent application Ser. No. 12/896,806, filed Oct. 1, 2010, by Brown et al., entitled "Apparatus and Method for Managing Software Application of a Mobile Device Server." All sections of the aforementioned applications are incorporated herein by reference in their entirety.

FIELD OF THE DISCLOSURE

The present disclosure relates generally to processing messages with a device server operating in a telephone.

BACKGROUND

Media communication systems such as interactive television systems can deliver media content to media processors. Generally, media content can be broadcast by these systems and delivered according to the type of services users have subscribed to. In interactive media communication systems, users can also request services on demand. Portable media devices such as mobile phones or media players can be adapted to communicate with media processors over a wireless medium. The combined use of portable and fixed media devices can provide users an environment for utilizing multimedia services.

DETAILED DESCRIPTION

The present disclosure describes, among other things, illustrative embodiments of a telephone that processes incoming and outgoing plain old telephone calls.

One embodiment of the present disclosure includes a device having a memory coupled to a controller. The controller can be operable to execute a web server application in the device, and establish wireless communications with a gateway communicatively coupled to a set-top box. The web server application can be operable to detect the set-top box, and transmit a message to a server by way of the gateway being assigned to a first Internet protocol address. In this embodiment the server can be remote from a location of the set-top box, and the message can include an identifier of a software application in the device and a second IP address associated with the software application. The web server application can also be operable to receive a request from the set-top box to execute the software application according to the second IP address, execute the software application to establish communication services between the device and the set-top box, and detect an incoming plain old telephone service call. The web server application can further be operable to identify a calling party identifier from the incoming plain old telephone service call, and direct the set-top box to present the calling party identifier.

One embodiment of the present disclosure includes a server having a memory coupled to a controller. The controller can be operable to receive a message from a web server application operating in a telephone by way of a gateway communicatively coupled to the server, and detect an identifier of the gateway. The message includes a request to invoke a software application in the telephone, and the software application is associated with an IP address. The controller can also be operable to establish communications with a media processor according to the identifier of the gateway and direct the media processor to invoke the software application in the telephone according to the IP address supplied by the web server application. The web server application operating in the telephone can be operable to detect an incoming plain old telephone service call, identify a calling party identifier from the incoming plain old telephone service call, and direct the media processor to present the calling party identifier.

One embodiment of the present disclosure includes a computer-readable storage medium in a telephone having computer instructions to execute a web server application in the telephone. The web server application can be operable to detect an incoming plain old telephone service call, identify a calling party identifier from the incoming plain old telephone service call, and direct one of a plurality of devices detected by web server application to present the calling party identifier.

Figure 1:
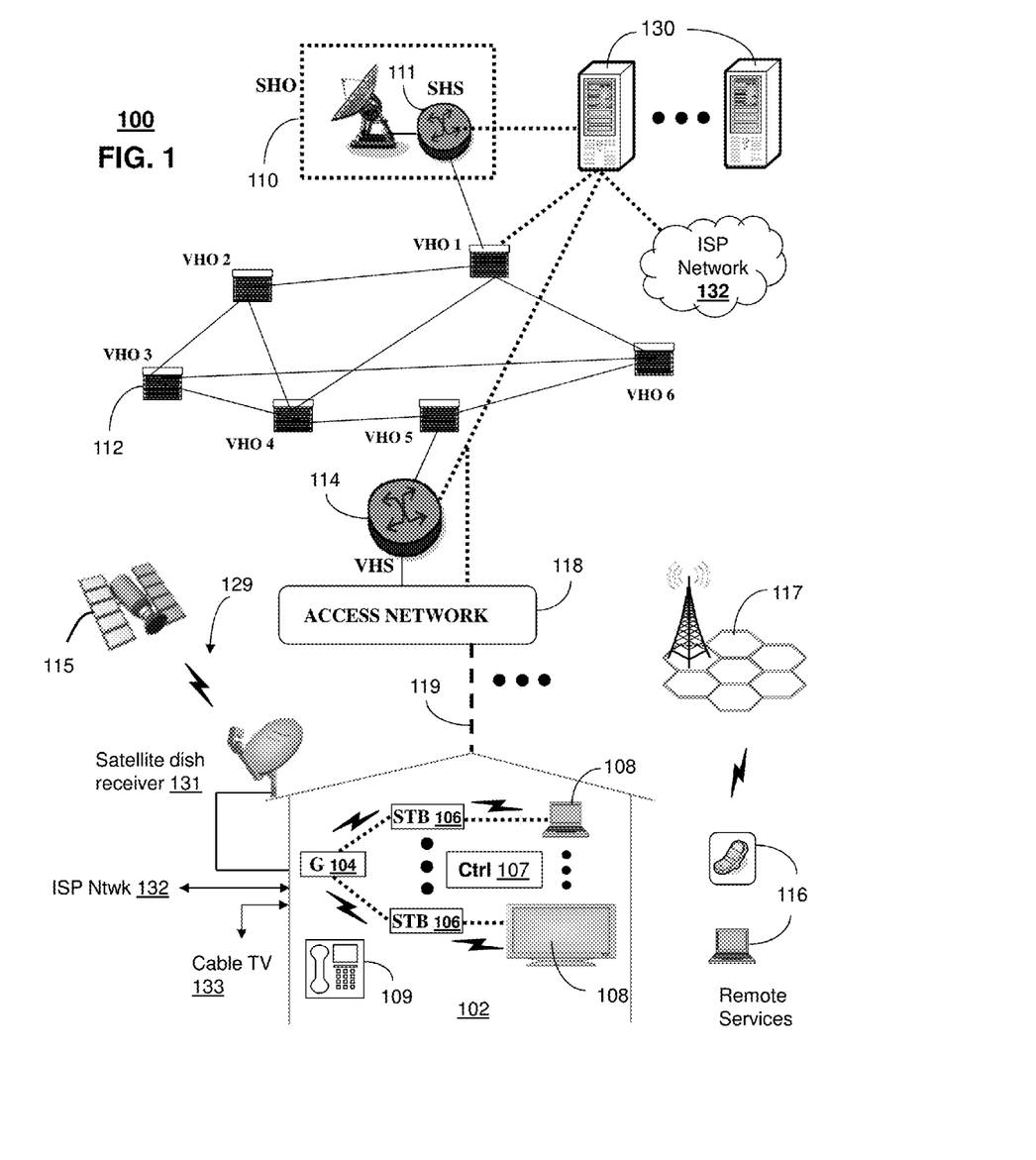
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a common satellite dish receiver 131 coupled to the building 102. Modulated signals received by the satellite dish receiver 131 can be transferred to the media processors 106 for decoding and distributing broadcast channels to the media devices 108. The media processors 106 can be equipped with a broadband port to the ISP network 132 to enable services such as VoD and EPG described above.

In yet another embodiment, an analog or digital cable broadcast distribution system such as cable TV system 133 can be overlaid, operably coupled with, or replace the IPTV system and/or the satellite TV system 129 as another representative embodiment of communication system 100. In this embodiment the cable TV system 133 can provide Internet, telephony, and interactive media services also.

It is contemplated that the present disclosure can apply to other present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116. The portal services can be provided using various components and/or techniques, including by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

System 100 can also provide for all or a portion of the computing devices 130 to function as a remote server (herein referred to as server 130). The server 130 can use computing and communication technology to perform the function of processing requests generated by a web server application operating in a plain old telephone service (POTS)-enabled telephone, such as the one shown in reference 109.

Figure 2:
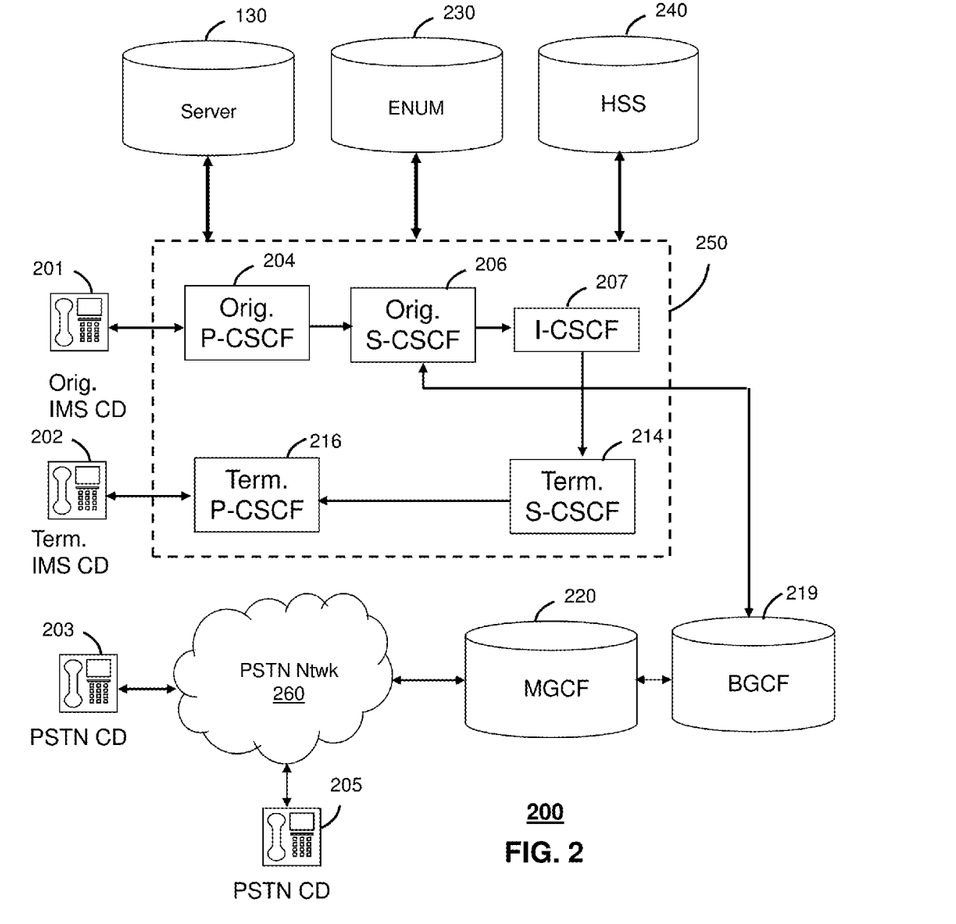

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

System 200 can include or otherwise be coupled with server 130 of FIG. 1 for purposes similar to those described above. It is further contemplated by the present disclosure that a web server can operate from any of the communication devices (e.g., references 201, 202, 203, and 205) depicted in FIG. 2 as will be described below.

Figure 3:
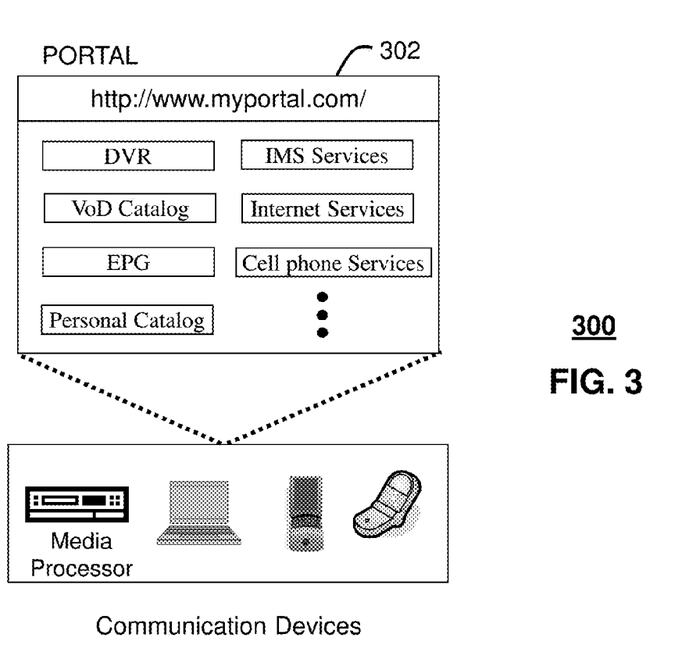
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

It is contemplated by the present disclosure that the web portal 302 can be utilized to manage operations of a POTS-enabled telephone and/or a remote server as described below.

Figure 4:
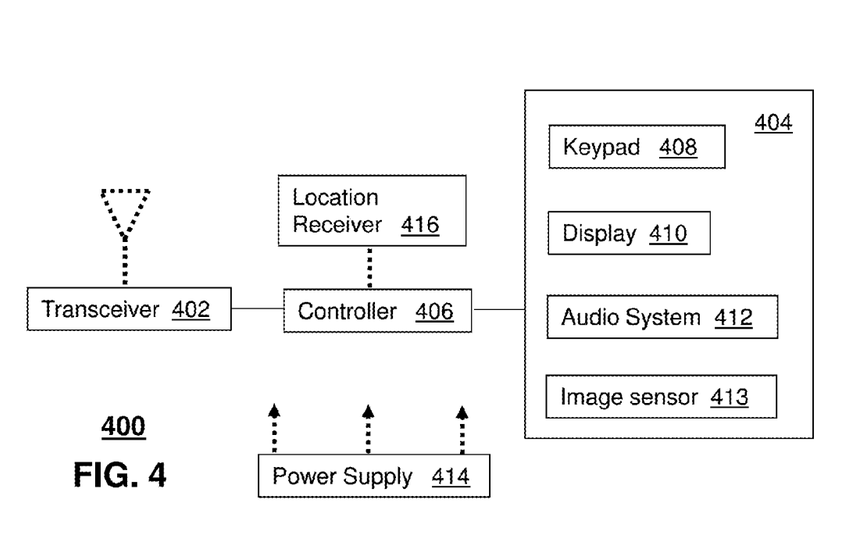
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the POTS-enabled telephone 109 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player. It is further contemplated by the present disclosure that the communication device 400 can operate as a mobile device server from which a web server application operates as described below.

Figure 5:
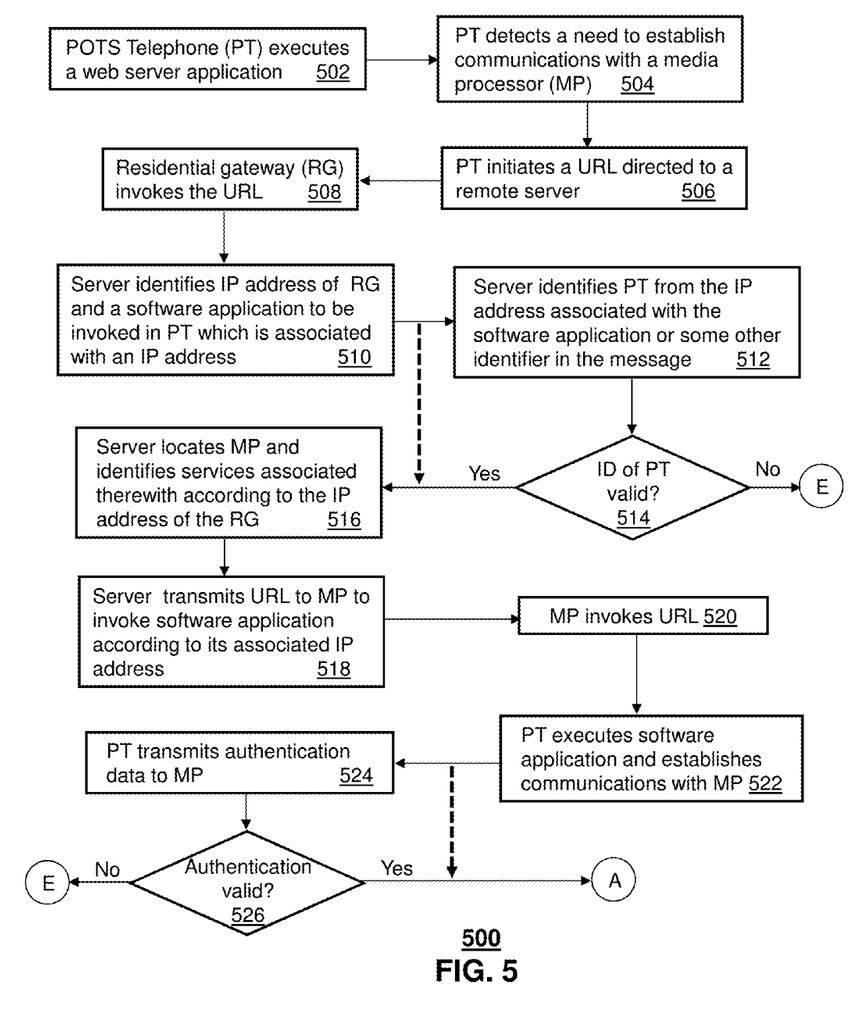
FIGS. 5-7 depict illustrative embodiments of a method operating in portions of the systems described in FIGS. 1-4.
Figure 6:
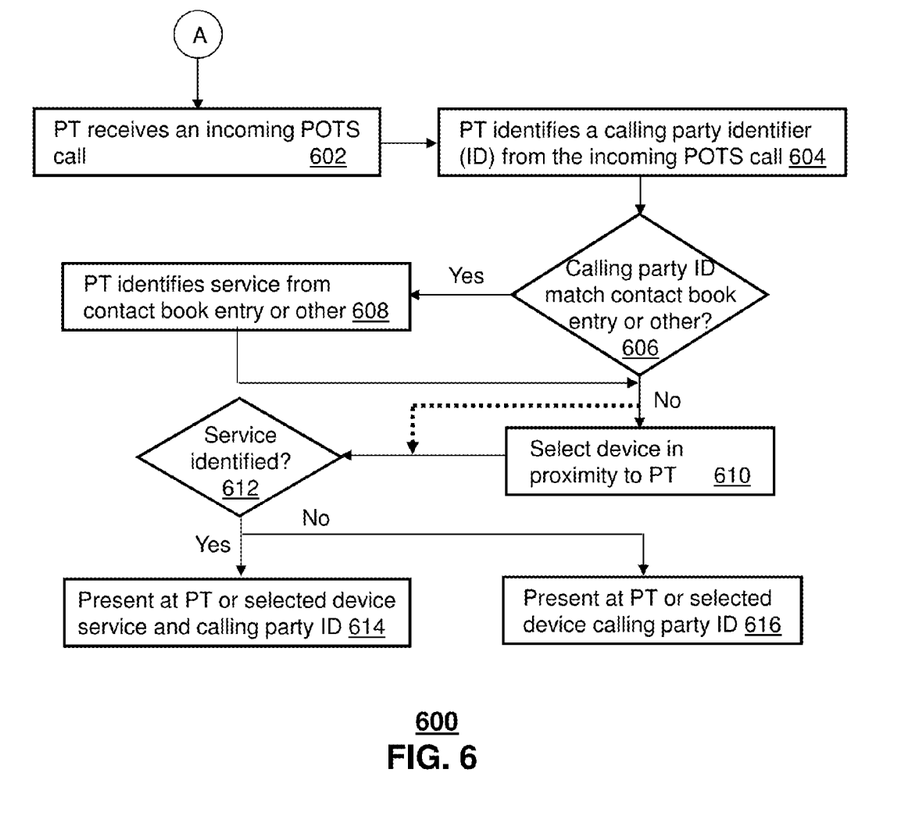
Figure 7:
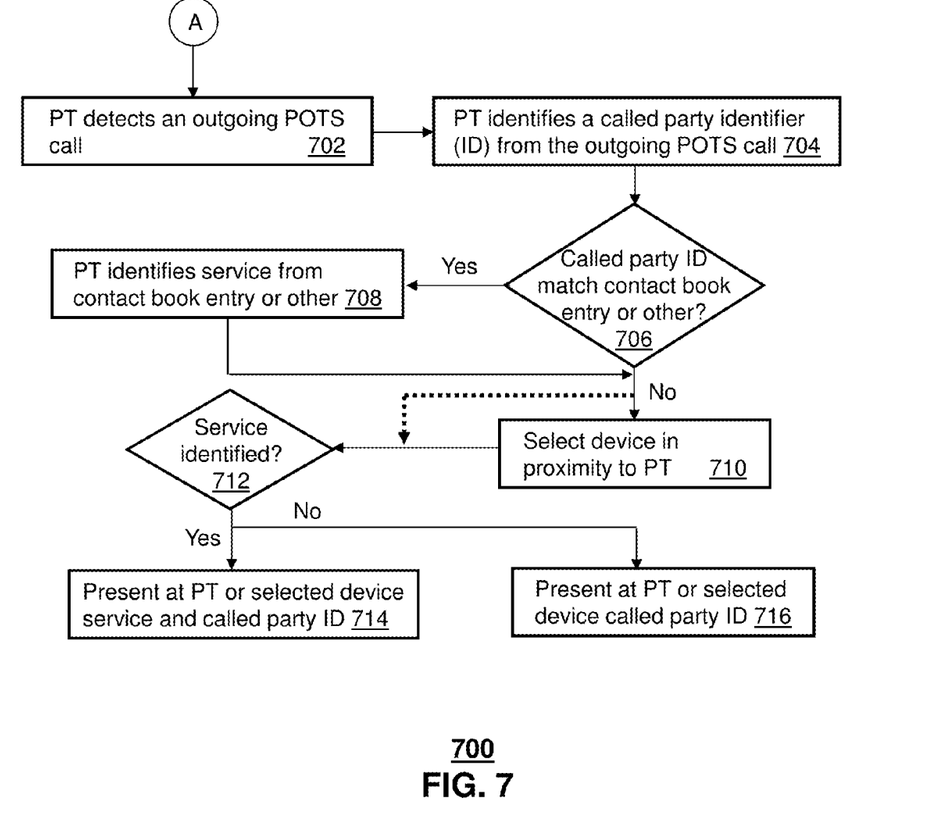
Figure 8:
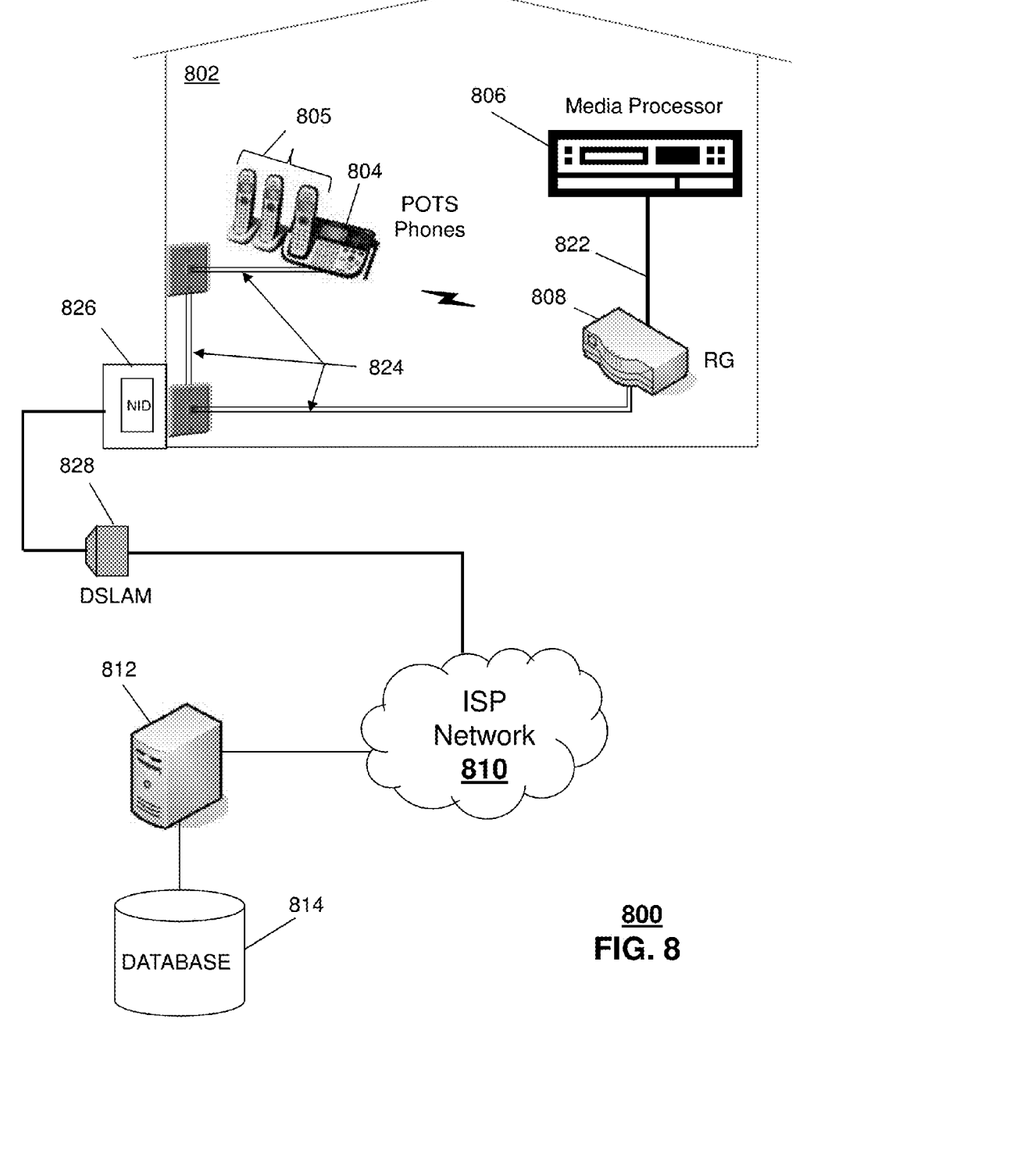
FIG. 8 depicts an illustrative embodiment of a system operating according to the method of FIG. 5.

FIGS. 5-7 depict illustrative embodiments of methods 500-700 that operate in portions of the devices of FIGS. 1-4. Method 500 can begin with step 502 in which a POTS-enabled telephone 804 such as shown in FIG. 8 executes a web server application. A web server application can represent a hypertext transfer protocol (HTTP) web server application implemented in software, hardware or combinations thereof operating from the controller 406 of the POTS-enabled telephone 804. A web server application can also be represented by any web server application used by a server or hosting computer system. Accordingly, any type of web server application (stripped down or feature comprehensive) that is operational in a POTS-enabled telephone 804 is contemplated by the present disclosure.

Referring back to step 502, this step can be initiated by a user manipulating the user interface of the POTS-enabled telephone 804, or can be automatically initiated by other triggers (e.g., time of day, user profile, or combinations thereof). The POTS-enabled telephone 804 can represent a POTS cordless telephone or a POTS tethered telephone comprising in whole or in part the components of the communication device 400 shown in FIG. 4 as described in the accompanying text. For illustration purposes, the present disclosure will make references to the components shown in FIG. 4 when discussing the operations of the POTS-enabled telephone 804.

Referring to FIG. 8, the POTS-enabled telephone 804 can be a POTS cordless phone capable of wirelessly communicating with a residential gateway 808 by wireless means such as WiFi. The WiFi connection can be setup with security means such as WiFi Protected Access (WPA), Wired Equivalent Privacy (WEP), and so on. During the setup process, a user can enter a security password for WPA or WEP to enable the WiFi connection between the POTS-enable Telephone 804 and the residential gateway 808. Each of the cordless handsets 805 can be communicatively coupled with the base 804 using DECT wireless technology. The base 804 can be communicatively coupled with a POTS interface 824 by twisted pair wires. The twisted pair wires 824 can originate from a network interface device (NID) 826 coupled to a DSLAM 828, which has access to an ISP network 810. The twisted pair wires 824 can also be coupled to the residential gateway 808 which can have an integrated DSL model and router that provides WiFi services to the POTS-enabled base 804 and wired Ethernet 822 services to the media processor 806, which in this illustration can represent a set-top box coupled to a TV set as described in FIG. 1. As will be described shortly, the POTS-enabled telephone 804 can be adapted to communicate with a remote server 812 by way of the residential gateway 808 over an IP interface such as that of the ISP network 810.

Referring back to FIG. 5, the web server application in the POTS-enabled telephone 804 can be operable to detect in step 504 a need to establish communications with a media processor 806 such as the STB 106 shown in FIG. 1. Step 504 can represent the web server application of the POTS-enabled telephone 804 scanning for media resources in building 802 by way of a residential gateway 808 providing access to a wireless network.

The web server application of the POTS-enabled telephone 804 can scan for the presence of media resources such as the media processor 806 by requesting information from the residential gateway 808. The residential gateway 808 can transmit to the POTS-enabled telephone 804 a list of the active devices on the WiFi network. Alternatively, or in combination, the web server application of the POTS-enabled telephone 804 can transmit a broadcast message on the WiFi network requesting identification of the devices communicatively coupled to the WiFi network. Other identification techniques are contemplated by the present disclosure.

Once the media processor 106 has been discovered by the web server application operating from the POTS-enabled telephone 804, the web server application can present the detected media resource(s) to a user over the UI 404 of the POTS-enabled telephone 804. The user can manipulate the UI 404 as previously described to indicate a desire to establish communications with the media processor 806, thereby establishing the need described in step 504 of FIG. 5. Alternatively, or in combination, the need to establish communications with the media processor 806 can be detected from a prior history of user actions, a profile established by the user of the POTS-enabled telephone 804 indicating a preference for establishing communications with the media processor 806, a need to establish communications automatically with the media processor 806, or any other triggers that may be definable by user behavior, user established settings, or service provider requirements. The UI 404 can be optionally password protected to prevent unauthorized use of the POTS-enabled telephone 804.

In step 506, the web server application in the POTS-enabled telephone 804 can initiate a URL directed to the remote server 812 by way of the residential gateway 808. The following URL is an illustrative embodiment of a URL that can be initiated by the POTS-enabled telephone 804: http://someServer.com/launchApp?special_app=http://<IP address of MDS x.x.x.x>/mrml.xml.

The URL illustrated above can include a domain name of the remote server 812 and instructions to launch a specific software application executable by the web server application in the POTS-enabled telephone 804. The URL can also include an IP address of the POTS-enabled telephone 804 which can be used to launch the software application. In step 508, the residential gateway 808 can invoke the URL and insert in the URL the IP address assigned to the residential gateway 808. The server 812 can receive the URL message by way of the ISP network 810 of FIG. 8. The server 812 can in turn identify in step 510 from an HTTP header of the URL message the IP address of the residential gateway 808. The server 812 can also identify from the URL message the software application to be invoked at the POTS-enabled telephone 804 (e.g., special_app), and the IP address associated with the software application which can be used to identify the software application and/or the POTS-enabled telephone 804.

In step 512, the remote server 812 can authenticate the request from the POTS-enabled telephone 804 with the IP address of the POTS-enabled telephone 804 or some other identifier added to the URL message (e.g., MAC address of the POTS-enabled telephone 804). If the server 812 does not recognize the POTS-enabled telephone 804 in step 514, method 500 can cease. Otherwise, if authentication is successful, the server 812 can proceed to step 516. Authentication of the POTS-enabled telephone 804 can be delegated to the media processor 806, in which case steps 512 and 514 would be bypassed.

At step 516, the server 812 can be operable to locate the media processor 806 and media services associated therewith according to the detected IP address of the residential gateway 808. The server 812 can locate the media processor 806 from a look-up table in a database 814 operating as a Domain Name Server (DNS), a subscriber database, or combinations thereof. Once the media processor 806 and services associated therewith have been identified, the server 812 can transmit to the media processor 806 in step 518 a URL message to invoke the software application in the POTS-enabled telephone 804 according to the IP address of the POTS-enabled telephone 804. The following is an illustrative embodiment of a URL message that can be transmitted to the media processor 806: http://<IP address of MDS x.x.x.x>/mrml.xml.

Once the media processor 806 invokes this URL in step 520, the web server application in the POTS-enabled telephone 804 can be operable to execute the software application in step 522 and thereby establish an initial state of communications with the media processor 806. Authentication of the POTS-enabled telephone 804 can take place in steps 524-526 prior to enabling media communication services between the POTS-enabled telephone 804 and the media processor 806. In step 524, the POTS-enabled telephone 804 can transmit authentication data to the media processor 806. The authentication data can comprise, for example, a security key provided by the service provider of the interactive communication systems of FIGS. 1-2. The security key can be encrypted data, a public key infrastructure (PKI) key, a personal identification number (PIN), login or password, or other form of security technology. The security key can be utilize to prevent POTS-enabled telephones 804 from utilizing media services of the communication systems of FIGS. 1-2 unless authorized by the service provider of these systems.

If the authentication data is invalid or not recognized, method 500 ceases. Otherwise, the media processor 806 proceeds to step 528 where it enable media communication services between the POTS-enabled telephone 804 and the media processor 806. Media communication services can conform to a markup language such as multimedia retrieval markup language (MRML) or an extensible markup language (XML). Other markup languages are contemplated by the present disclosure. In step 530, the web server application operating in the POTS-enabled telephone 804 can control media services of the media processor 806 with an exchange of markup language instructions transmitted over the WiFi network in the premises 802.

FIGS. 6-7 depict illustration embodiments of what the web server application of the POTS-enabled telephone 804 can accomplish after establishing communications with the media processor 806. For example, in step 602 the POTS-enabled telephone 804 can be adapted to detect an incoming POTS call. In step 604 the POTS-enabled telephone 804 can identify from the POTS call a calling party identifier (ID) supplied by a central office switch. The calling party ID can identify, for example, the party who is initiating the POTS call. In step 606, the POTS-enabled telephone 804 can be adapted to search a contact book for an entry that matches the calling party ID. If a contact book entry is found that matches the calling party ID, the POTS-enabled telephone 804 can identify in step 608 a service from the contact book entry which the user of the contact book desires to initiate upon receiving a call from the party associated with the contact book entry. This desire can be expressed by one or more preferences established in the contact book entry. It is further noted that the contact book can be in the POTS-enabled telephone 804 or a network element of communication systems 100-200.

For instance, a user can establish in his/her contact book a preference that indicates that when a particular family member calls, the user desires for a social network service (e.g., Facebook™) to be launched. Similar preferences can be established at the time the contact book entry is created or as relationships evolve or circumstances change. Other launchable services are contemplated by the present disclosure, such as gaming services, instant messaging services, and so on.

Referring back to step 606, if the calling party ID does not match a contact book entry, the POTS-enabled telephone 804 can be adapted to search other sources such as the Yellow Pages™, the White Pages™, or other sources which may identify the calling party and/or services associated therewith. If a match is not found, then the POTS-enabled telephone 804 can proceed to step 610.

At step 610, the POTS-enabled telephone 804 can be adapted to select one or more devices from a plurality of devices in proximity to the POTS-enabled telephone 804. The POTS-enabled telephone 804 can make this determination from input provided by the user of the POTS-enabled telephone 804 through a graphical user interface (GUI) prompt menu listing devices accessible by way of the residential gateway 808, or by other means such as detection by the POTS-enabled telephone 804 of network activity generated by the user (e.g., switching TV channels presented by the media processor 806), a wireless signal (e.g., an RFID signal) emitted by nearby devices which can be detected by the POTS-enabled telephone 804, and so on.

At step 612, the POTS-enabled telephone 804 determines if a service has been identified in step 608. If so, then the POTS-enabled telephone 804 can be adapted to direct the one or more selected devices to present in step 614 the service and the calling party ID. If a service was not identified in step 608, then the POTS-enabled telephone 804 can direct the one or more selected devices to present in step 616 only the calling party ID. In another embodiment, the POTS-enabled telephone 804 can be adapted to present at the POTS-enabled telephone 804 the service and caller ID in step 614 or caller ID only in step 616, or a combination of these presentations at the one or more selected devices and the POTS-enabled telephone 804.

FIG. 7 depicts how the POTS-enabled telephone 804 can be adapted to process outgoing POTS calls. In step 702, the POTS-enabled telephone 804 can detect an outgoing POTS call. In step 704, the POTS-enabled telephone 804 can identify a called party ID from the outgoing POTS call. The called party ID can represent an identification of the party that the user of the POTS-enabled telephone 804 is attempting to reach. In step 706, the POTS-enabled telephone 804 can be adapted to determine whether the called party ID matches a contact book entry, or other databases such as Yellow Pages™. If a match is not found, the POTS-enabled telephone 804 proceeds to step 710. Otherwise, the POTS-enabled telephone 804 proceeds to step 708 where it identifies a service from the contact book entry or other source. At step 710, the POTS-enabled telephone 804 can identify one or more devices in close proximity. If a service has been identified, the POTS-enabled telephone 804 proceeds from step 712 to 714 where the service and the called party ID are presented at the POTS-enabled telephone 804, the one or more selected devices, or a combination thereof. Otherwise, the called party ID only is presented at the POTS-enabled telephone 804, the one or more selected devices, or a combination thereof.

Methods 500-700 provide a means to substantially extend the capabilities of a POTS-enabled telephone 804. For example, the aforementioned methods enable the POTS-enabled telephone to initiate complex services in combination with called party or calling party identification at one or more devices accessible to the POTS-enabled telephone 804.

Upon reviewing the aforementioned embodiments, it would be evident to an artisan with ordinary skill in the art that said embodiments can be modified, reduced, or enhanced without departing from the scope and spirit of the claims described below. For example, method 500 can be adapted so that a POTS-enabled telephone 804 can communicate with other devices that execute a web server application. In this configuration, method 500 can be adapted so that the POTS-enabled telephone 804 and the other devices executing a web server application can function in a master-slave arrangement.

Other suitable modifications can be applied to the present disclosure without departing from the scope of the claims below. Accordingly, the reader is directed to the claims section for a fuller understanding of the breadth and scope of the present disclosure.

Figure 9:
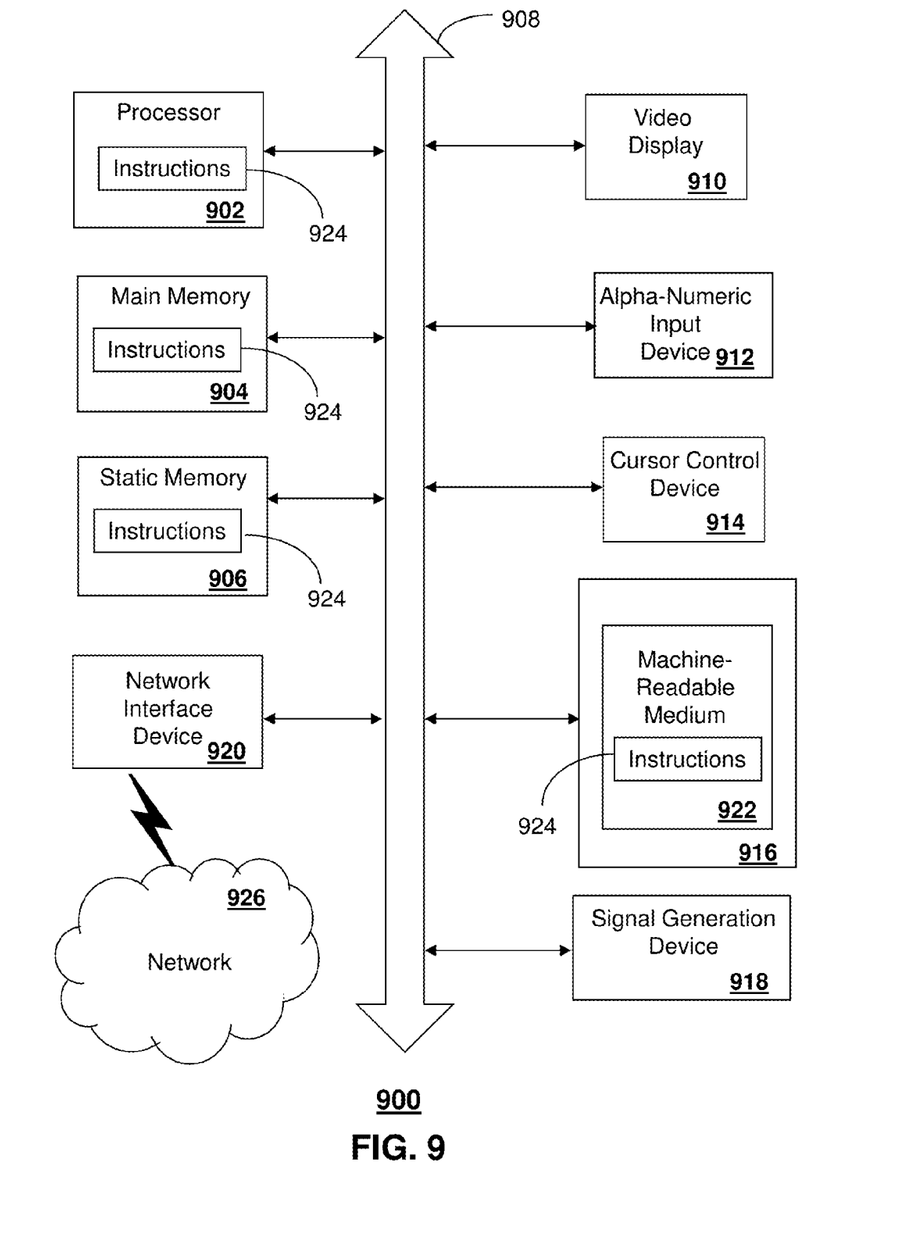
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. The machine can operate, for example, as the POTS-enabled telephone 804, the media processor 806, the gateway 808, the remote server 812, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
 a processing system including a processor; and
 a memory that stores executable instructions that, when executed by the processing system, facilitate performance of operations, comprising:
  executing a web server application; and
  facilitating, through the web server application, wireless communications with a gateway communicatively coupled to a set-top box, detecting the set-top box;
detecting an incoming plain old telephone service call;
transmitting a message to a server by way of the gateway being assigned to a first IP address, wherein the server is remote from a location of the set-top box, and wherein the message comprises an identifier of a software application associated with the incoming plain old telephone service call in the apparatus and a second IP address associated with the software application;
receiving a request from the set-top box to execute the software application according to the second IP address; and
executing the software application to establish communication services between the apparatus and the set-top box.

2. The apparatus of claim 1, wherein the communication services comprise a social network service.

3. The apparatus of claim 1, wherein the operations further comprise:
identifying a calling party identifier from the incoming plain old telephone service call; and
directing the set-top box to present the calling party identifier.

4. The apparatus of claim 3, wherein the operations further comprise:
presenting a prompt that requests a selection of apparatuses to present one of the calling party identifier and the communication services; and
directing the set-top box to present one of the calling party identifier and the service at the set-top box responsive to receiving a response to the prompt indicating that the set-top box has been selected.

5. The apparatus of claim 4, wherein the operations further comprise:
detecting a database entry that matches the calling party identifier; and
identifying the communication services from the database entry.

6. The apparatus of claim 5, wherein the database entry is a contact book entry stored in the apparatus.

7. The apparatus of claim 6, wherein the contact book entry comprises one of an identification of the communication services and preferences for initiating the communication services.

8. The apparatus of claim 1, wherein the operations further comprise directing the set-top box to present the communication services.

9. The apparatus of claim 1, wherein messages transmitted between the apparatus and the set-top box conform in part to a markup language, and wherein the gateway inserts the first IP address into a hypertext transfer protocol header of the message.

10. The apparatus of claim 1, wherein the apparatus comprises one of a plain old telephone service cordless telephone, and a plain old telephone service tethered telephone.

11. A server, comprising:
a processing system including a processor; and
a memory that stores executable instructions that, when executed by the processing system, facilitate performance of operations, comprising:
receiving a message from a web server application operating in a media device by way of a gateway communicatively coupled to the server, wherein the message includes a web server IP address;
detecting an outgoing plain old telephone service call;
detecting an identifier of the gateway, wherein the message comprises a request to invoke a software application in the media device associated with the outgoing plain old telephone service call, and wherein the software application is associated with an IP address;
initiating communications with a media processor according to the identifier of the gateway; and
directing the media processor to invoke the software application in the media device according to the web server IP address.

12. The server of claim 11, wherein the operations further comprise:
identifying a called party identifier from the outgoing plain old telephone service call;
identifying a service according to the called party identifier; and
directing the media processor to present the service.

13. The server of claim 12, wherein the operations further comprise:
identifying a service according to the called party identifier; and
directing the media processor to present the service.

14. The server of claim 13, wherein messages transmitted between the media device and the media processor conform to a markup language.

15. The server of claim 12, wherein the operations further comprise:
identifying the called party identifier in a database entry; and
identifying a service according to the called party identifier, wherein the database entry is a contact book entry stored in the media device, and wherein the contact book entry comprises an identification of the service and preferences for initiating the service.

16. The server of claim 11, wherein the identifier of the gateway comprises a first IP address or a media access control address assigned to the gateway, and wherein the web server application corresponds to a hypertext transfer protocol server application operating in the media device.

17. The server of claim 11, wherein the media device comprises one of a plain old telephone service cordless telephone, and a plain old telephone service tethered telephone, and wherein the media processor comprises one of a computer, a set-top box, and a smart phone.

18. A machine-readable storage device, comprising executable instructions that, when executed by a processing system including a processor, facilitate performance of operations, comprising:
initiating a web server application in a communications device;
detecting an incoming plain old telephone service call;
transmitting, via the web server application, a message to a remote server by way of a gateway assigned to a first IP address, wherein the remote server is remote from a location of a media processor and wherein the message comprises an identifier of a software application in the device associated with the incoming plain old telephone service call; and
a second IP address associated with the software application;
receiving a request from the media processor to initiate the software application according to the second IP address; and
initiating the software application to establish communication services between the device and the media processor.

19. The machine-readable storage device of claim 18, wherein the operations further comprise:

identifying a calling party identifier from the incoming plain old telephone service call; and directing one of a plurality of devices detected by web server application to present the calling party identifier.

20. The machine-readable storage medium device of claim 19, wherein the operations further comprise the transmitting the message to the remote server, wherein the message comprises the first IP address located in a hypertext transfer protocol header of the message, and the identifier of the software application associated with the second IP address, and wherein the remote server establishes communications with a media processor according to the first IP address and directs the media processor to invoke the software application in the communications device according to the second IP address to enable processing of the incoming plain old telephone service call.

* * * * *

UNITED STATES PATENT AND TRADEMARK OFFICE
CERTIFICATE OF CORRECTION

PATENT NO. : 9,736,198 B2  
APPLICATION NO. : 14/615516  
DATED : August 15, 2017  
INVENTOR(S) : David Brux DeLorme, Anita Simpson and Nicholas Peter Hill Page 1 of 1

It is certified that error appears in the above-identified patent and that said Letters Patent is hereby corrected as shown below:

In the Claims

In Column 15, Line 1, Claim 20 please delete "medium"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*